(12) United States Patent
Aoyagi et al.

(10) Patent No.: US 12,037,208 B2
(45) Date of Patent: Jul. 16, 2024

(54) UNLOADING APPARATUS AND UNLOADING METHOD

(71) Applicants: KABUSHIKI KAISHA TOSHIBA, Tokyo (JP); Toshiba Infrastructure Systems & Solutions Corporation, Kawasaki (JP)

(72) Inventors: Toshiaki Aoyagi, Koga (JP); Masakazu Itoya, Kawasaki (JP); Akihiro Yamazaki, Yokohama (JP)

(73) Assignees: KABUSHIKI KAISHA TOSHIBA, Tokyo (JP); Toshiba Infrastructure Systems & Solutions Corporation, Kawasaki (JP)

( * ) Notice: Subject to any disclaimer, the term of this patent is extended or adjusted under 35 U.S.C. 154(b) by 200 days.

(21) Appl. No.: 17/656,932

(22) Filed: Mar. 29, 2022

(65) Prior Publication Data
US 2022/0219922 A1 Jul. 14, 2022

Related U.S. Application Data

(63) Continuation of application No. PCT/JP2020/039736, filed on Oct. 22, 2020.

(30) Foreign Application Priority Data

Oct. 25, 2019 (JP) .............................. JP2019-194592

(51) Int. Cl.
*B65G 59/04* (2006.01)
*B25J 15/06* (2006.01)
*B65G 47/91* (2006.01)

(52) U.S. Cl.
CPC .......... *B65G 59/04* (2013.01); *B25J 15/0616* (2013.01); *B65G 47/91* (2013.01)

(58) Field of Classification Search
None
See application file for complete search history.

(56) References Cited

U.S. PATENT DOCUMENTS 6,652,014 B2 * 11/2003 Schmalz .............. B25J 15/0616
414/737
8,473,094 B2 * 6/2013 Becker ................. B65G 47/918
414/796

(Continued)

FOREIGN PATENT DOCUMENTS

CN 108373049 A * 8/2018 ........... B65G 1/0435
EP 2149521 A1 * 2/2010 ............. B65G 59/04

(Continued)

OTHER PUBLICATIONS

International Search Report issued Dec. 15, 2020 in PCT/JP2020/039736, filed on Oct. 22, 2020, 2 pages.

*Primary Examiner* — Joseph A Dillon, Jr.
(74) *Attorney, Agent, or Firm* — Maier & Maier, PLLC (57) ABSTRACT

According to one embodiment, an unloading apparatus includes a first sucking portion sucking an upper surface of a package, a second sucking portion sucking a side surface of the package, a first moving device moving the first sucking portion and the second sucking portion, a rotation portion rotatably connecting the first and second sucking portions to the first moving device, and a processor configured to control the first moving device. In a state in which the upper and side surfaces of the package are sucked, the processor is configured to control the first moving device to move the first moving device upward along a direction intersecting the side surface of the package sucked by the second sucking portion or a surface obtained by virtually extending the side surface.

7 Claims, 7 Drawing Sheets

(56) References Cited

U.S. PATENT DOCUMENTS

| | | | |
|---|---|---|---|
| 9,498,887 B1* | 11/2016 | Zevenbergen | B25J 15/0052 |
| 9,757,858 B2* | 9/2017 | Eto | B25J 9/1612 |
| 10,192,315 B2* | 1/2019 | Eto | B65G 61/00 |
| 10,226,865 B2 | 3/2019 | Nakayama | |
| 10,351,362 B2 | 7/2019 | Tanaka et al. | |
| 10,457,490 B2 | 10/2019 | Nakamoto et al. | |
| 11,420,339 B2* | 8/2022 | Fujihara | B25J 15/0052 |
| 11,702,297 B2* | 7/2023 | Yabe | B25J 15/0061 |
| | | | 414/222.01 |
| 2016/0137435 A1 | 5/2016 | Tanaka et al. | |
| 2016/0347558 A1* | 12/2016 | Eto | B65G 59/04 |
| 2019/0322451 A1* | 10/2019 | Bastian, II | B65G 1/1375 |
| 2020/0180875 A1 | 6/2020 | Yabe | |
| 2021/0101760 A1* | 4/2021 | Yabe | B25J 15/0052 |

FOREIGN PATENT DOCUMENTS

| | | |
|---|---|---|
| JP | 10-53334 A | 2/1998 |
| JP | 2016-55995 A | 4/2016 |
| JP | 2016-94280 A | 5/2016 |
| JP | 2018-176348 A | 11/2018 |
| JP | 2019-48375 A | 3/2019 |

\* cited by examiner

UNLOADING APPARATUS AND UNLOADING METHOD

CROSS-REFERENCE TO RELATED APPLICATIONS

This application is a Continuation Application of PCT Application No. PCT/JP2020/039736, filed Oct. 22, 2020 and based upon and claiming the benefit of priority from prior Japanese Patent Application No. 2019-194592, filed Oct. 25, 2019, the entire contents of all of which are incorporated herein by reference.

FIELD

Embodiments described herein relate generally to a package unloading apparatus and a package unloading method.

BACKGROUND

An unloading apparatus that unloads a package loaded on a mount portion such as a pallet is known. The unloading apparatus unloads the package by holding any one of side surfaces and an upper surface of the package and moving the package to a predetermined position.

DETAILED DESCRIPTION

A problem to be solved by one embodiment is to provide an unloading apparatus and an unloading method capable of unloading a package more efficiently.

According to one embodiment, an unloading apparatus includes a first sucking portion, a second sucking portion, a first moving device, a rotation portion, and a processor. The first sucking portion is configured to suck an upper surface of a package. The second sucking portion is configured to suck a side surface of the package. The first moving device is configured to move the first sucking portion and the second sucking portion. The rotation portion rotatably connects the first sucking portion and the second sucking portion to the first moving device. The processor is configured to control the first moving device. The processor is configured to control the first moving device to move the first moving device upward along a direction intersecting the side surface of the package sucked by the second sucking portion or a surface obtained by virtually extending the side surface in a state in which the upper surface of the package is sucked by the first sucking portion and the side surface of the package is sucked by the second sucking portion. The processor thereafter is configured to control the first moving device to move the first moving device to a position where the package is to be placed in the state.

Various Embodiments will be described hereinafter with reference to the accompanying drawings.

An unloading apparatus 12 according to an embodiment will be described using FIGS. 1 to 7.

Figure 1:
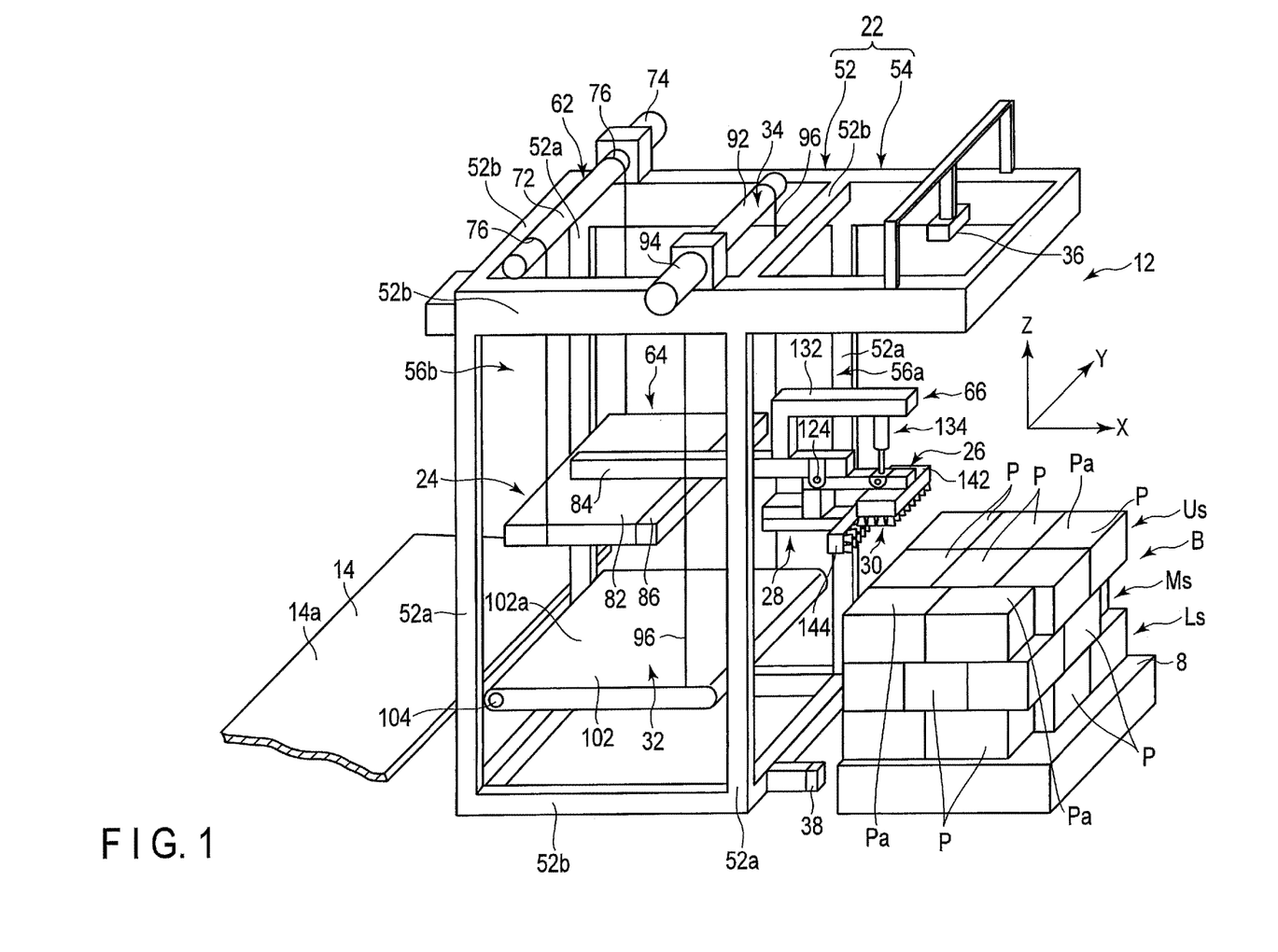
FIG. 1 is a schematic perspective view showing an unloading apparatus according to an embodiment.
Figure 2:
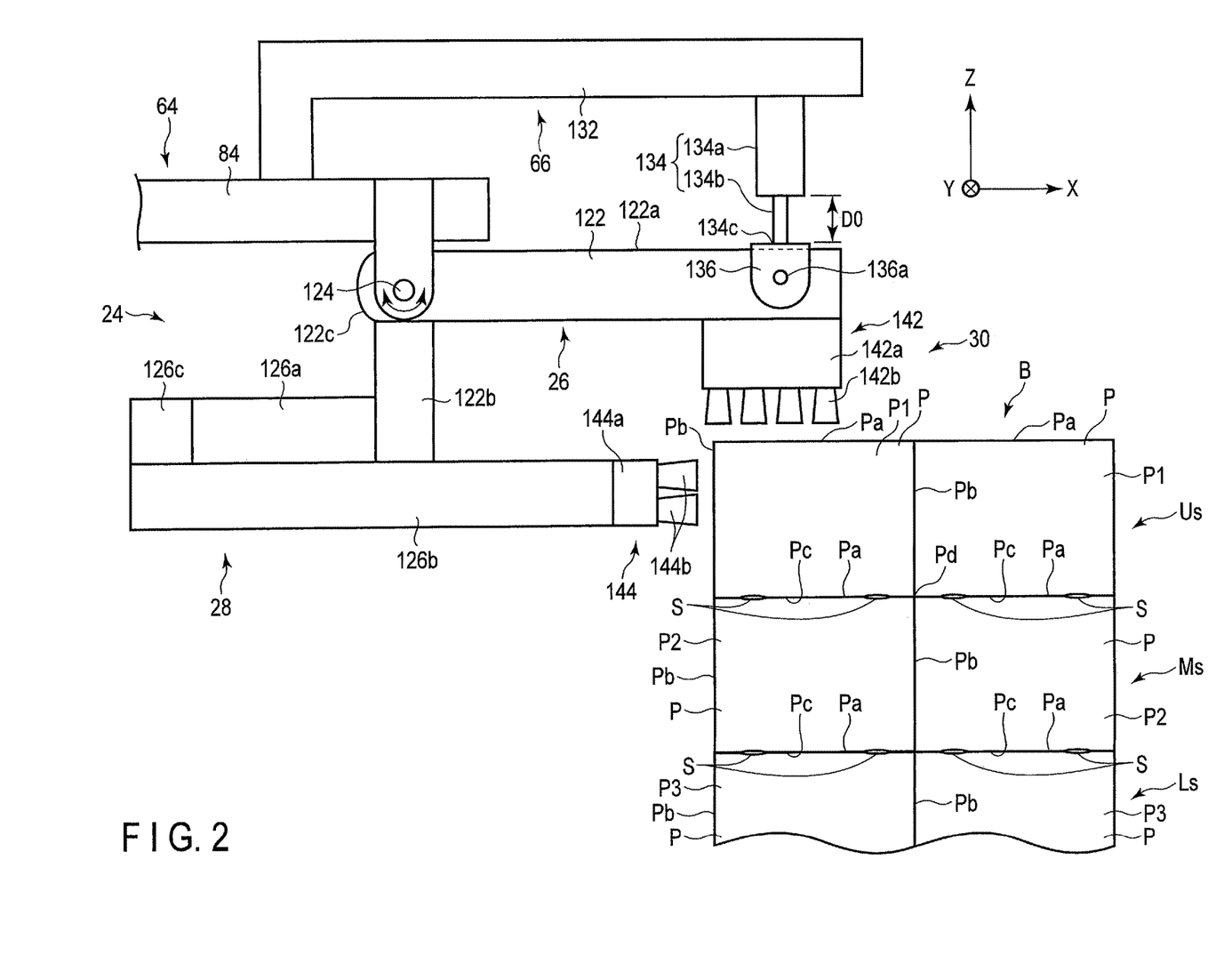
FIG. 2 is a schematic view showing a first moving mechanism, a support portion (rotation portion), a second moving mechanism, and a grip portion of the unloading apparatus according to the embodiment.
Figure 3:
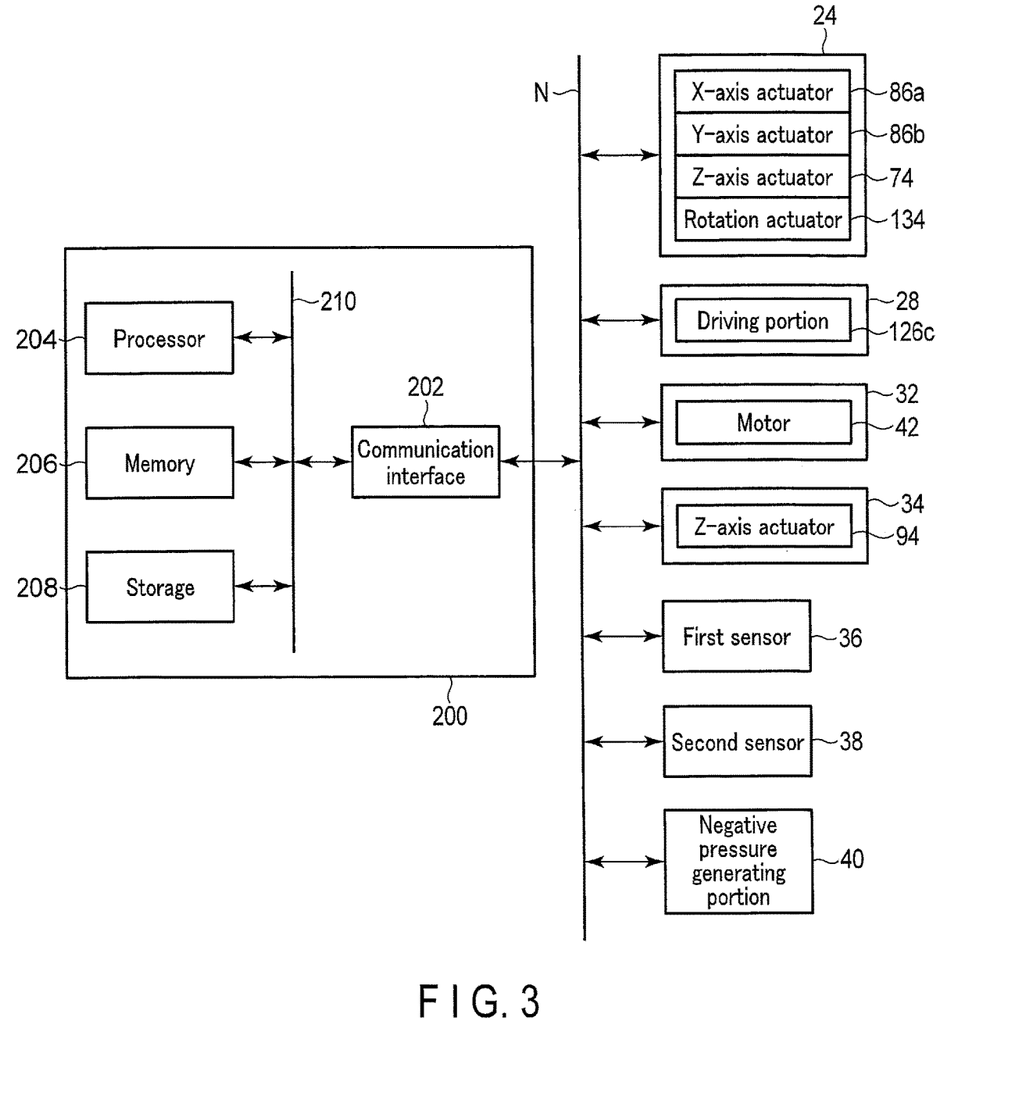
FIG. 3 is a schematic block diagram of the unloading apparatus according to the embodiment.
Figure 4:
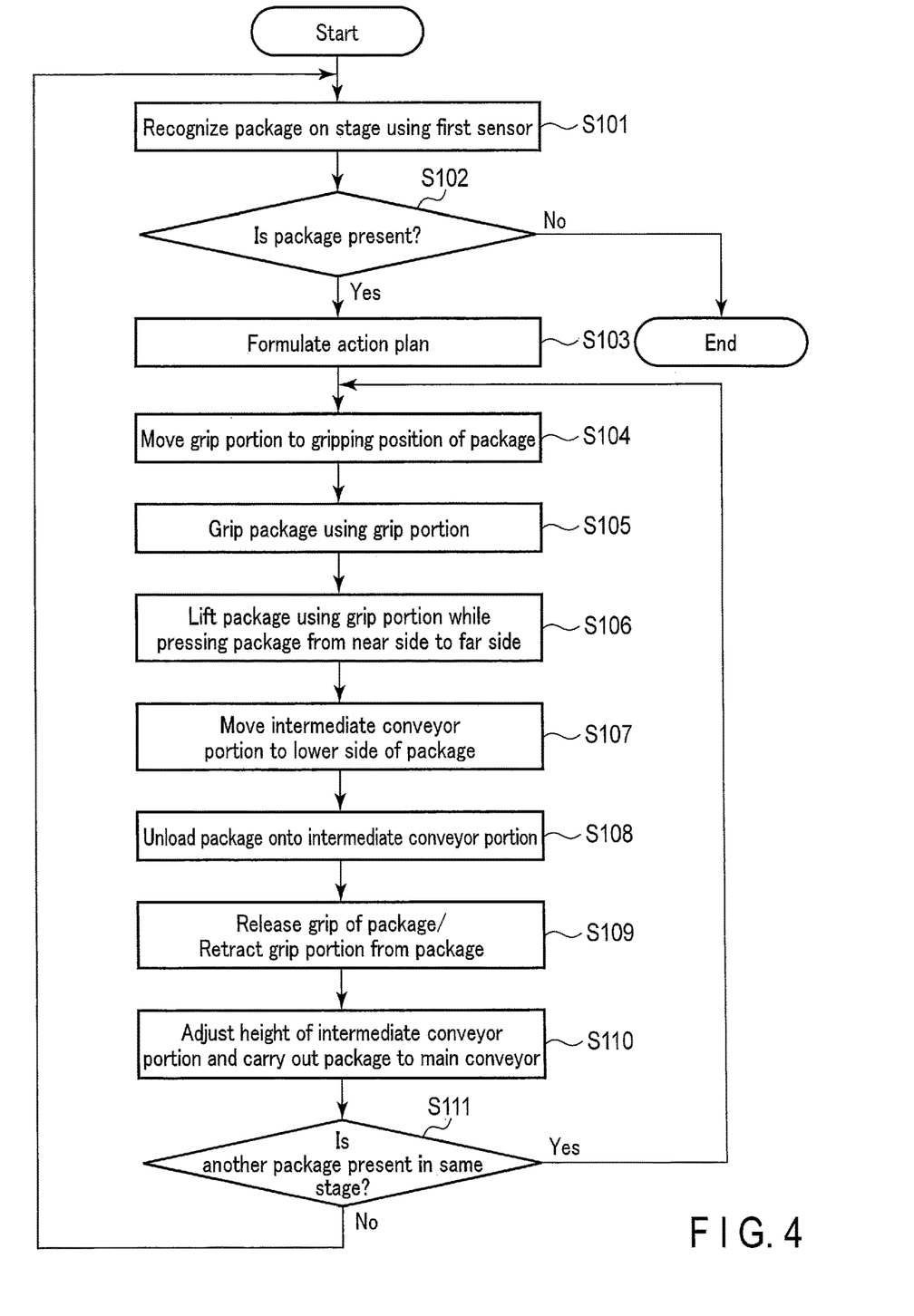
FIG. 4 is a flowchart showing an example of an operation of the unloading apparatus according to the embodiment.
Figure 5:
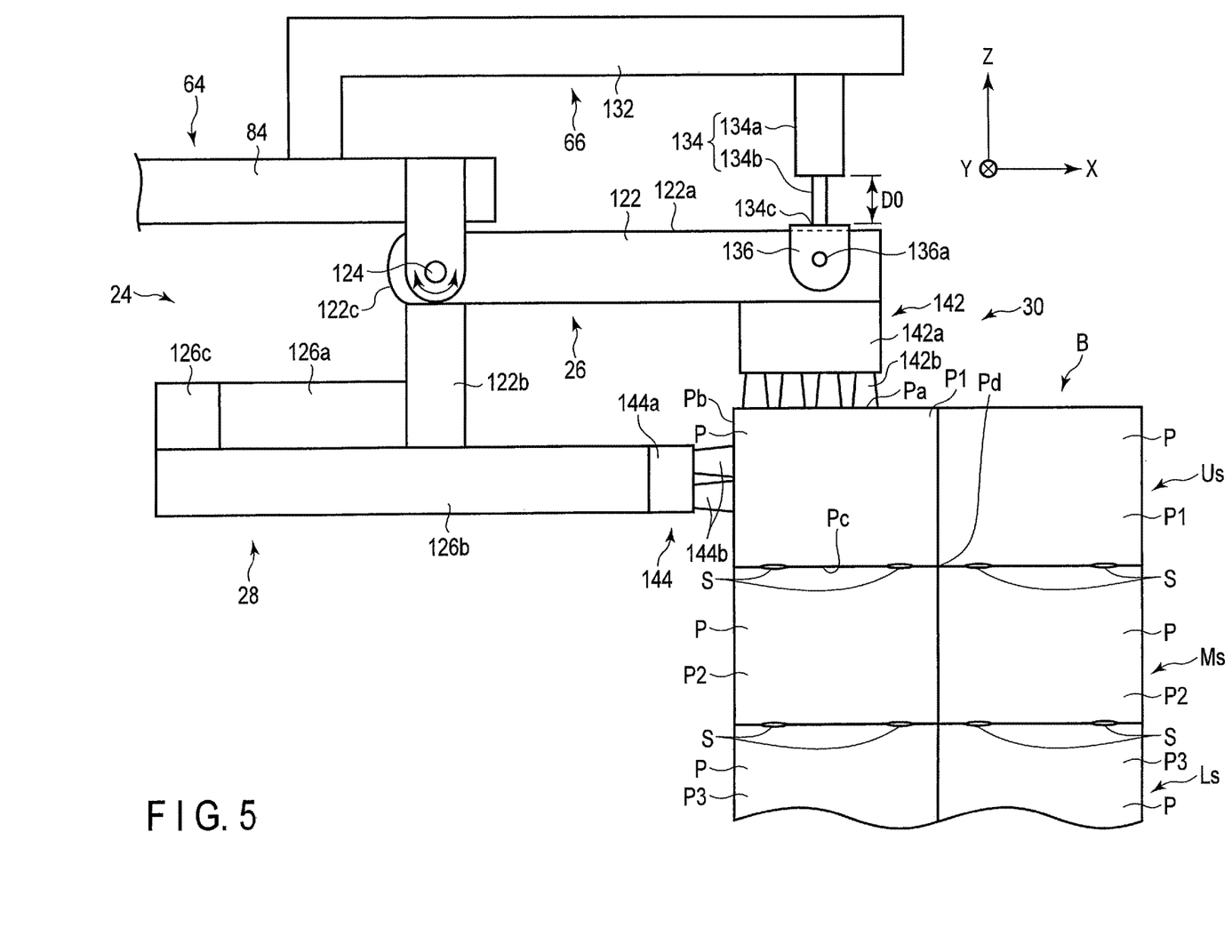
FIG. 5 is a schematic view describing an example of the operation of the unloading apparatus according to the embodiment.
Figure 6:
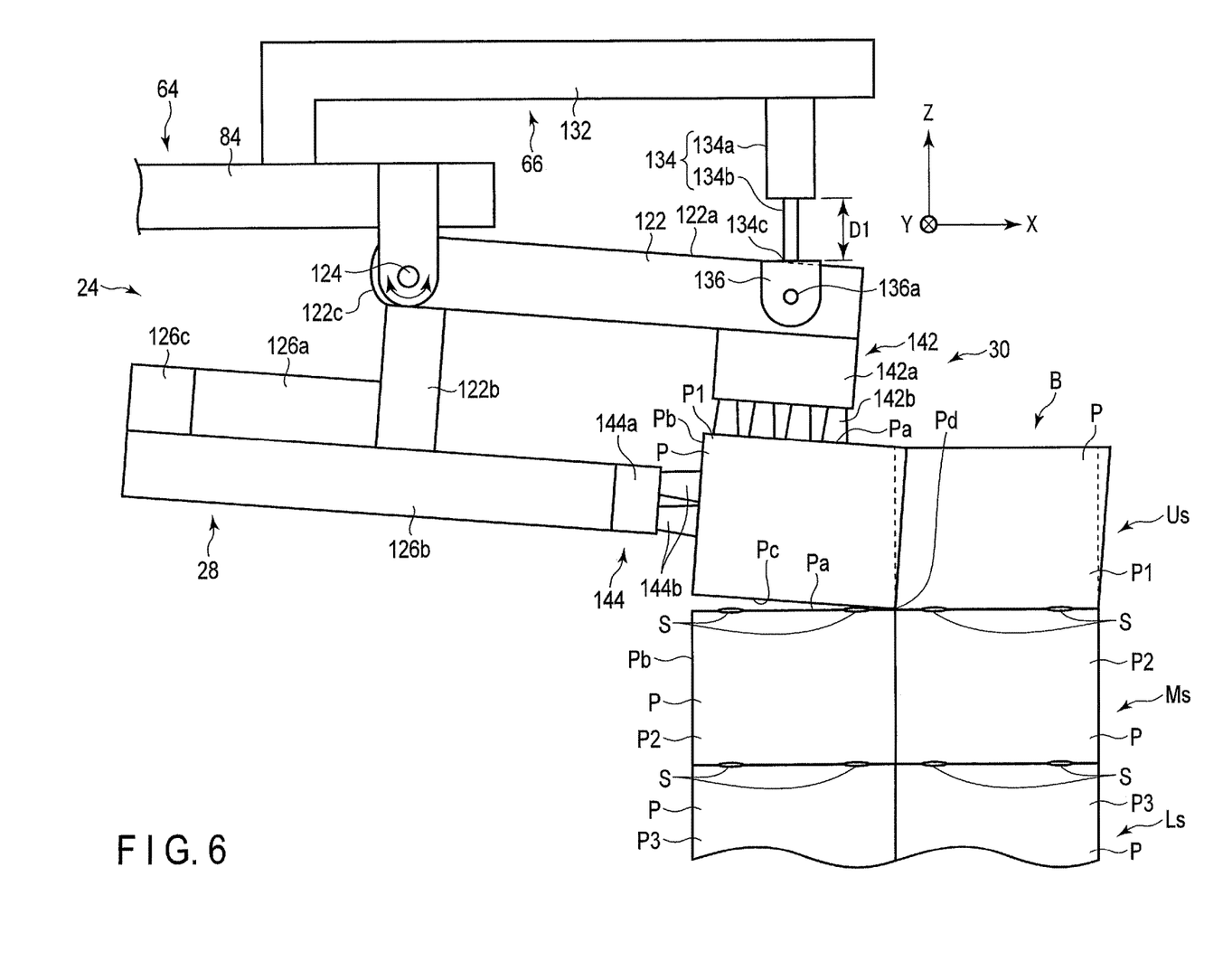
FIG. 6 is a schematic view describing an example of the operation of the unloading apparatus according to the embodiment.
Figure 7:
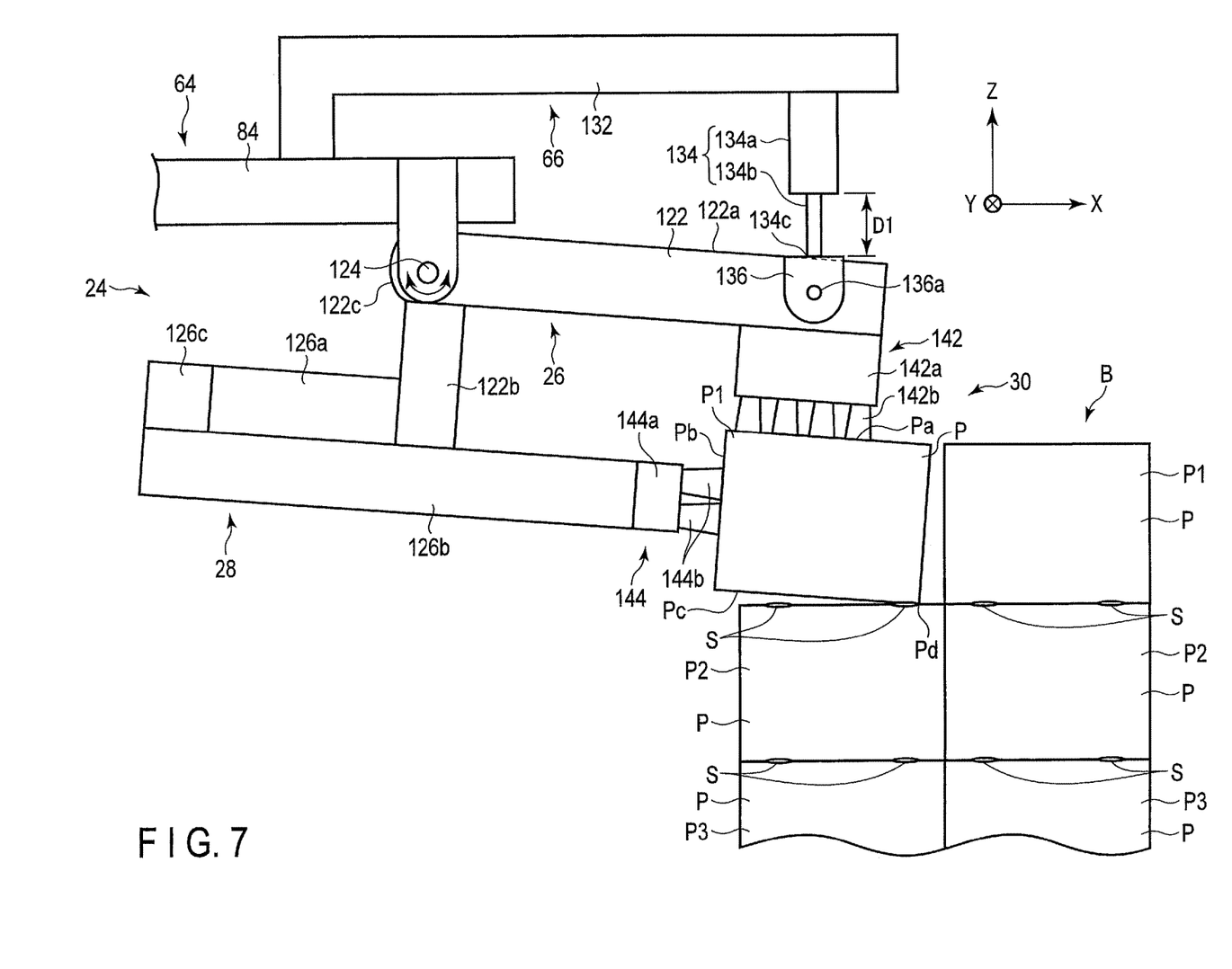
FIG. 7 is a schematic view describing an example of the operation of the unloading apparatus according to the embodiment.

FIG. 1 is a view schematically showing an example of the unloading apparatus 12. FIG. 2 is a view schematically showing a first moving device 24, a support portion (rotation portion) 26, a second moving device 28, and a grip portion 30 of the unloading apparatus 12. FIG. 3 is a schematic block diagram of the unloading apparatus 12. FIG. 4 is a flowchart showing an example of an operation of the unloading apparatus 12. FIGS. 5 to 7 are explanatory views describing a series of operations from gripping to lifting, for example, a selected package P from a mount portion 8 using the unloading apparatus 12.

The unloading apparatus 12 shown in FIG. 1 takes out and unloads the package P one by one or a plurality of packages P simultaneously from the mount portion 8 such as a table on which the plurality of packages P are placed, and carries out the unloaded packages P to a main conveyor 14.

The unloading apparatus 12 includes a frame 22, the first moving device 24, the support portion (rotation portion) 26, the second moving device 28, and the grip portion 30. The unloading apparatus 12 further includes an intermediate conveyor portion 32, a lifting and lowering portion (an intermediate conveyor portion lifting and lowering portion) 34, a first sensor 36, and a second sensor 38.

The unloading apparatus 12 is an apparatus that grips each package P of a package group B loaded on the mount portion 8 arranged in the vicinity of the unloading apparatus 12, unloads the package P onto the intermediate conveyor portion 32, and carries out the package P from the intermediate conveyor portion 32 to the main conveyor 14.

Here, the loaded package group B refers to one or a plurality of stages stacked including a plurality of packages P that are, for example, substantially rectangular parallelepipeds.

In FIG. 1, as an example, the package group B includes packages P stacked in three stages. The package group B includes three stages, an uppermost stage Us, a middle stage Ms, and a lowermost stage Ls. Each of the uppermost stage Us, the middle stage Ms, and the lowermost stage Ls includes a plurality of packages P. There is a case where the package P in the uppermost stage Us is indicated by a reference sign P1. There is a case where the package P in the middle stage Ms is indicated by a reference sign P2. There is a case where the package P in the lowermost stage Ls is indicated by a reference sign P3. The upper surface of each package P is indicated by a reference sign Pa, the side surface is indicated by a reference sign Pb, and the bottom surface is indicated by a reference sign Pc.

For example, the heights of the packages P1 included in the uppermost stage Us may be the same as or different from each other. The same applies to the packages P2 included in the middle stage Ms and the packages P3 included in the lowermost stage Ls. The packages P included in the same stage may have different vertical lengths (depth) and horizontal lengths (width). The orientations of the packages P included in the same stage may be the same, or may be different as long as the side surfaces of the plurality of packages P face each other. For example, in FIG. 1, each of the stages Us, Ms, and Ls of the package group B includes a plurality of packages P having different orientations. The mount portion 8 of the loaded package group B is not limited to a flat pallet, and the package group may be accommodated in a cage-like pallet with a caster, a roll box pallet (RBP), or the like.

One or a plurality of packages P may be placed directly on the mount portion 8, or an appropriate sheet may be arranged so that one or a plurality of packages P are placed indirectly on the sheet. In a present embodiment, placing the package P on the mount portion 8 includes both directly and indirectly placing the package P on the mount portion 8.

As in an example shown in FIG. 2, for example, in order to prevent the occurrence of package collapse during transportation in a truck, an appropriate anti-slip treatment agent S such as a glue may be attached between the bottom surface Pc of the package P1 and the upper surface Pa of the lower package P2 on the upper and lower sides, and between the bottom surface Pc of the package P2 and the upper surface Pa of the package P3. The anti-slip treatment agent S prevents or suppresses horizontal slip between the bottom surface Pc of the package P1 and the upper surface Pa of the package P2. With the anti-slip treatment agent S, when the package P1 on the upper side is lifted upward, frictional force and adhesive force that prevent the package P2 on the lower side from being lifted together may act between the upper and lower packages P1 and P2. In this manner, the upper and lower packages P1 and P2 and the packages P2 and P3 are in a light adhesion state due to the anti-slip treatment agent S.

Adhesive force between the upper and lower packages P1 and P2 and the packages P2 and P3 due to the anti-slip treatment agent S largely varies. Therefore, when the package P1 on the upper side is lifted upward, the package P2 on the lower side may be lifted together, and a load may be applied to the exterior of the package P2 on the lower side.

In addition, when the package P is unloaded from the package group B on the mount portion 8, the upper and lower packages P1 and P2 may be dragged together without being separated due to friction caused by the anti-slip treatment agent S, which may collapse the stage.

The anti-slip treatment agent S is not attached between the packages P on the front and rear sides and the left and right sides in the same stage. That is, the anti-slip treatment agent S is not attached to the side surface of the package P. Therefore, the slip between the upper and lower packages P1 and P2 and the slip between the upper and lower packages P2 and P3 are prevented by the anti-slip treatment agent S.

The anti-slip treatment agent S may be attached in a dotted or linear shape between the bottom surface Pc of the package P1 and the upper surface Pa of the package P2, or may be attached in a planar shape so as to have an appropriate area. Similarly, the anti-slip treatment agent S may be attached in a dotted or linear shape between the bottom surface Pc of the package P2 and the upper surface Pa of the package P3, or may be attached in a planar shape so as to have an appropriate area. An example of the package P is a cardboard box enclosing a plurality of plastic bottles.

As shown in FIG. 1, the frame 22 includes, for example, a frame body 52 and a protrusion portion 54.

As shown in FIGS. 1 and 2, an XYZ coordinate system is set. An X-axis direction is an arrangement direction of the mount portion 8 with respect to the frame 22 and an arrangement direction of the main conveyor 14 with respect to the frame 22. As an example, the X-axis direction is a moving direction (front-rear direction) of the package P when the package P is taken out from the package group B on the mount portion 8. A Y-axis direction is a width direction (left-right direction). A Z-axis direction is an up-down direction.

As shown in FIG. 1, the frame body 52 includes, for example, four pillar portions 52a extending in the Z-axis direction, and a plurality of beam portions 52b provided at upper and lower ends of the four pillar portions 52a and extending in the X-axis direction and the Y-axis direction. The frame body 52 has a front opening 56a and a rear opening 56b in the front-rear direction. One or a plurality of packages P are grasped from the mount portion 8 outside the frame body 52, placed on the intermediate conveyor portion 32 in the frame body 52 through the front opening 56a, and carried out to the main conveyor 14 outside the frame body 52 through the rear opening 56b.

The protrusion portion 54 is arranged above the position where the mount portion 8 is disposed. A first sensor 36 that detects information related to the package P is installed to the protrusion portion 54. That is, the first sensor 36 is installed to the frame 22 and is arranged above a position where the package group B on the mount portion 8 is disposed.

The first sensor 36 is, for example, a stereo camera. The stereo camera measures a distance between the camera and each package P of the package group B based on parallax when images are captured from two different points. The first sensor 36 photographs the package group B loaded on the mount portion 8, and detects the position, size, and shape of each package P of the package group B. Therefore, the first sensor 36 detects information related to the package P including position information of the package P.

A second sensor 38 measures a distance between the second sensor 38 and the package P. The second sensor 38 is provided between the package group B loaded on the mount portion 8 and the intermediate conveyor portion 32 in the X-axis direction. The second sensor 38 is installed to the bottom frame of the beam portion 52b of the frame body 52 of the frame 22, for example.

The second sensor 38 is, for example, a laser range finder (LRF). The LRF is, for example, an optical instrument that oscillates an infrared laser from a measurement position where the second sensor 38 is installed to emit laser light, and measures a distance to the package P based on the time from the emission of the laser light to the reception of reflected light by the package P grasped by the grip portion 30. The second sensor 38 measures the height of the bottom surface Pc of the package P by measuring the distance to the bottom surface Pc of the package P on the movement locus of the package P grasped by the grip portion 30 and moved by the grip portion 30 to the intermediate conveyor portion 32. The laser light is not limited to infrared laser light, and may be laser light of a visible light beam, ultraviolet light beam, X-ray, and the like.

Then, the height of each package P can be calculated from the information of the distance to the upper surface Pa of the package P acquired by the first sensor 36 and the distance to the bottom surface Pc of the package P by the second sensor 38.

The main conveyor 14 is provided on the side opposite to the position where the first sensor 36 and the second sensor 38 are located along the X axis with respect to the frame 22. The conveying direction of the main conveyor 14 is, for example, the Y-axis direction.

As shown in FIG. 2, the first moving device 24 is supported by the frame body 52 of the frame 22.

The first moving device 24 includes a lifting and lowering mechanism 62 that moves in the Z-axis direction, a horizontal moving device 64 that moves in the X-axis direction and the Y-axis direction, and a connecting portion (rotation assisting portion) 66 that connects the horizontal moving device 64 and the support portion 26.

The lifting and lowering mechanism 62 includes, for example, a shaft 72 that extends in the Y-axis direction and is supported by the beam portion 52b at the upper end of the frame body 52, a Z-axis actuator 74 that is supported by one end of the shaft 72 and rotates the shaft 72, and a plurality of wires 76 wound around the shaft 72. The shaft 72 may extend not in the Y-axis direction but in the X-axis direction. When the Z-axis actuator 74 is driven, the shaft 72 rotates. When the shaft 72 rotates, the horizontal moving device 64 supported by the wires 76 is lifted and lowered.

The lifting and lowering mechanism 62 is simply required to be configured to lift and lower the horizontal moving device 64, and is not limited to the above-described configuration. For example, the horizontal moving device 64 may be lifted and lowered by directly supporting the wires 76 using a linear motor (Z-axis actuator) or the like, instead of rotating the shaft 72.

The horizontal moving device 64 includes, for example, a base 82 supported by the wires 76, an arm 84 extending in the X-axis direction, and a movable portion 86 movably supporting the arm 84. The arm 84 can be moved by the movable portion 86 in the X-axis direction with respect to the base 82. The arm 84 can be moved by the movable portion 86 in the Y-axis direction with respect to the base 82. The movable portion 86 includes an X-axis actuator 86a and a Y-axis actuator 86b (see FIG. 3).

The first moving device 24 according to the present embodiment includes an orthogonal robot arm that linearly moves in three axial directions shown in FIG. 1, that is, the X-axis direction (front-rear direction), the Y-axis direction (left-right direction), and the Z-axis direction (height direction). The first moving device 24 can move the arm 84 independently in the X-axis direction, the Y-axis direction, and the Z-axis direction in response to the control of the grip portion 30 by a controller 200 to be described later. That is, the operation of the first moving device 24 is controlled by the controller 200. The first moving device 24 moves the grip portion 30 to a position where the package P of the package group B is grasped, and places the package P grasped by the grip portion 30 on the intermediate conveyor portion 32, for example, by moving the arm 84 in the X-axis direction, the Y-axis direction, and the Z-axis direction.

The support portion 26 is supported by the end or the area near the end of the arm 84 of the horizontal moving device 64. The support portion 26 supports the grip portion 30. The support portion 26 is provided on the side opposite to the main conveyor 14 along the X-axis direction of the first moving device 24. The support portion 26 integrally moves with the movement of the arm 84 of the horizontal moving device 64 in the X-axis direction, the Y-axis direction, and the Z-axis direction. A part or whole of the support portion 26 can be moved by the first moving device 24 between a position where the support portion is arranged in the space inside the frame body 52 of the frame 22 and a position where the support portion is arranged below the protrusion portion 54 outside the frame body 52 of the frame 22 through the front opening 56a of the frame body 52.

The support portion 26 includes a base portion 122 and a rotation shaft 124 supporting the base portion 122 on the arm 84 of the horizontal moving device 64 of the first moving device 24.

The base portion 122 has, for example, a substantially L shape. The base portion 122 includes an arm 122a configured in a rod shape extending in one direction, and an extension portion 122b extending from one end in the longitudinal direction of the arm 122a in a direction orthogonal to the longitudinal direction of the arm 122a. It is preferable that the arm 122a and the extension portion 122b are integrally formed, and the angle between the extending direction of the arm 122a and the extending direction of the extension portion 122b is invariable.

As shown in FIG. 2, the base portion 122 configured as described above is supported by the arm 84 of the first moving device 24 so as to be rotatable by the rotation shaft 124 that is parallel to the Y-axis direction, at the boundary between the arm 122a and the extension portion 122b. That is, the support portion 26 is rotatable by the rotation shaft 124 in the Y-axis direction, with respect to the horizontal moving device 64.

At the initial position, the arm 122a and the extension portion 122b have a positional relationship that allows the arm 122a to be parallel to the X-axis direction (front-rear direction) and the extension portion 122b to take a posture extending downward along the Z-axis direction. The end surface of the arm 122a on the main conveyor 14 side, which is the rotation shaft 124 side, is configured as, for example, a curved surface 122c that allows the arm 122a of the support portion 26 to rotate within an appropriate range with respect to the arm 84 of the horizontal moving device 64. The maximum rotation amount of the base portion 122 (the arm 122a and the extension portion 122b) of the support portion 26 with respect to the arm 84 of the horizontal moving device 64 may be defined by an appropriate stopper.

The base portion 122 is configured to be rotatable by a predetermined angle from the initial position in a state in which an upper surface sucking portion (upper surface holding portion) 142 and a side surface sucking portion (side surface holding portion) 144 of the grip portion 30 do not grip or hold the package P. The predetermined angle is an angle at which the grip portion 30 does not come into contact with the first moving device 24 when the base portion 122 of the support portion 26 rotates about the rotation shaft 124 due to the action of a rotation actuator 134 to be described later and the weight of the package P. In the present embodiment, the predetermined angle is, for example, 10 degrees to 15 degrees. The maximum rotation angle of the base portion 122 may be the same as or larger than the predetermined angle.

The second moving device 28 is supported by the support portion (rotation portion) 26. The second moving device (front-rear moving device) 28 is supported on the extension portion 122b of the base portion 122 of the support portion 26. The second moving device 28 is supported below the base portion 122 of the support portion 26 and is used to move the side surface sucking portion 144 to be described later in the front-rear direction. The operation of the second moving device 28 is controlled by the controller 200. The second moving device 28 includes a base portion 126a fixed to, for example, the extension portion 122b of the base portion 122, a moving portion 126b connected to the base portion 126a so as to be movable in the X axis direction, and a driving portion 126c for the moving portion 126b. The driving portion 126c is fixed to the base portion 126a, for example. The side surface sucking portion 144 to be described later of the grip portion 30 is supported on, for example, the end of the moving portion 126b in the moving direction. The position where the moving portion 126b is farthest from the upper surface sucking portion 142 in the front-rear direction is defined as the initial position.

When the driving portion 126c is driven to move the moving portion 126b, the side surface sucking portion 144 moves. The driving portion 126c is, for example, a motor. The second moving device 28 configured as described above is fixed to the base portion 122 in a posture in which the moving direction of the moving portion 126b is parallel to the front-rear direction when the base portion 122 is at the initial position.

The connecting portion 66 includes, for example, an arm 132 extending forward along the X-axis direction from above the arm 84 of the horizontal moving device 64, and the rotation actuator 134 supported by the arm 132. For example, an air cylinder is used as the rotation actuator 134. The rotation actuator 134 includes a cylinder 134a and a piston 134b that can be taken in to and out from the cylinder 134a by air supplied from an appropriate pump. For example, the cylinder 134a is supported by the arm 132. A protrusion end 134c of the piston 134b is supported by the arm 122a of the base portion 122 of the support portion 26 through a shaft member 136a of a rotation metal fitting 136.

By adjusting the protrusion amount of the protrusion end 134c of the piston 134b with respect to the cylinder 134a of the rotation actuator 134, the rotation amount of the support portion 26 about the axis of the rotation shaft 124 with respect to the horizontal moving device 64 is adjusted. Therefore, the unloading apparatus 12 can actively move the support portion 26 with respect to the horizontal moving device 64 using the rotation actuator 134.

At the initial position (fixed position) shown in FIG. 2 in which the piston 134b is pulled into the cylinder 134a, the protrusion amount of the protrusion end 134c of the piston 134b with respect to the cylinder 134a of the rotation actuator 134 is defined as D0. From the initial position, at the rotation position shown in FIGS. 6 and 7 in which the piston 134b is pushed out from the cylinder 134a, the protrusion amount of the protrusion end 134c of the piston 134b with respect to the cylinder 134a of the rotation actuator 134 is defined as D1.

By adjusting the protrusion amount (position) of the protrusion end 134c of the piston 134b of the rotation actuator 134, the arm 122a of the base portion 122 is maintained at the initial position parallel to the front-rear direction in a state in which the package P is not grasped by the grip portion 30. In a state in which the package P is grasped by the grip portion 30, the support portion 26 rotates about the axis of the rotation shaft 124, and the arm 122a of the base portion 122 shifts to an inclined position inclined in the front-rear direction.

The weights of the base portion 122 of the support portion 26, the second moving device 28, the grip portion 30, and further the package P are applied to the rotation actuator 134. The piston 134b of the rotation actuator 134 can be pushed out from and pulled into the cylinder 134a in a state in which the above-described weight is applied thereto. It is preferable that the piston 134b can adjust the pushing speed and/or the pulling speed with respect to the cylinder 134a in a state in which the above-described weight is applied.

In the present embodiment, when the package is appropriately grasped by the grip portion 30 and the protrusion amount of the piston 134b with respect to the cylinder 134a is shifted from D0 to D1, free rotation is performed due to the weights of the support portion 26, the second moving device 28, the grip portion 30, and the package P. That is, the rotation actuator 134 uses a single-acting air cylinder as an example. At this time, the rotation actuator 134 is used as a damper to slowly rotate the base portion 122 of the support portion 26. When the protrusion amount of the piston 134b with respect to the cylinder 134a is shifted from D1 to D0, the support portion 26 is moved to the initial position (fixed position) at an appropriate speed against the weights of the support portion 26, the second moving device 28, and the grip portion 30.

In FIG. 2, the cylinder 134a is arranged on the arm 132 of the connecting portion 66, and the piston 134b is connected to the arm 122a of the base portion 122 of the support portion 26 via the rotation metal fitting 136. The cylinder 134a may be connected to the arm 122a of the base portion 122 of the support portion 26, and the piston 134b may be connected to the arm 132 of the connecting portion 66.

As the rotation actuator 134, an electric cylinder or the like may be used in addition to the air cylinder.

In the present embodiment, an example that uses the air cylinder as the rotation actuator 134 supported on the arm 132 of the connecting portion 66 of the first moving device 24 will be described. The arm 132 of the connecting portion 66 may be rotated about an axis (Y axis) parallel to the rotation shaft 124 with respect to the arm 84 of the horizontal moving device 64. At this time, an appropriate motor can be used as a rotation actuator for rotating the arm 132 of the connecting portion 66.

The grip portion 30 grips the package P of the package group B and releases grip. The grip portion 30 includes, for example, the upper surface sucking portion (first sucking portion) 142 that is supported by the arm 122a of the support portion 26 and sucks the upper surface Pa of the package P, and the side surface sucking portion (second sucking portion) 144 that is supported by the moving portion 126b of the second moving device 28 and sucks the side surface Pb of the package P on the frame body 52 side. The upper surface sucking portion 142 faces downward at the initial position. The side surface sucking portion 144 faces a direction away from the frame 22 (far side) at the initial position. The directions in which the upper surface sucking portion 142 and the side surface sucking portion 144 face can be changed due to the rotation of the support portion 26. The upper surface sucking portion 142 and the side surface sucking portion 144 are fixed at a predetermined angle. The predetermined angle is, for example, 90 degrees. Therefore, the grip portion 30 can grip the package P by sucking the upper surface Pa of the package P using the upper surface sucking portion 142 and sucking the side surface Pb of the package P using the side surface sucking portion 144.

The upper surface sucking portion 142 includes a first body (block body) 142a having a substantially rectangular parallelepiped shape, and a plurality of first suction pads (upper surface sucking portion) 142b supported by the first body 142a. The first suction pads 142b face downward. The first suction pads 142b are connected to, for example, a negative pressure generating portion 40 (see FIG. 3) controlled by the controller 200. Therefore, the upper surface sucking portion 142 grips the upper surface Pa of the package P by means of suction.

The side surface sucking portion 144 includes a second body (block body) 144a having a substantially rectangular parallelepiped shape, and a plurality of second suction pads (side surface sucking portion) 144b supported by the second body 144a. The second body 144a is supported by, for example, the moving portion 126b of the second moving device 28. The second suction pads 144b face a direction away from the frame 22. The second suction pads 144b are connected to, for example, a negative pressure generating portion 40 (see FIG. 3) controlled by the controller 200.

Therefore, the side surface sucking portion 144 grips the side surface Pb of the package P by means of suction.

The numbers of the first suction pads 142b and the second suction pads 144b of the grip portion 30 each may be one or more. The first suction pads 142b and the second suction pads 144b grip the package P by means of vacuum suction by the negative pressure generating portion 40. When the first suction pads 142b and the second suction pads 144b are brought under a negative pressure in a state in which the first suction pads 142b and the second suction pads 144b are in contact with the surfaces of the package P, the first suction pads 142b and the second suction pads 144b are vacuum-sucked to the surfaces of the package P. When the negative pressure in the first suction pads 142b and the second suction pads 144b is released, the suction pads release the package P. The gripping and grip releasing of the package P are performed when the controller 200 controls the negative pressure generating portion 40.

Various gripping mechanisms other than the suction pads may be adopted as the grip portion 30. The grip portion may include, for example, a gripper that grips the package P. The gripper includes a plurality of fingers and a plurality of articulation mechanisms connecting the plurality of fingers. The articulation mechanism may be configured such that the finger operates in conjunction with the operation of the articulation mechanism. The gripper applies a force to the package, for example, from a plurality of opposing directions at two or more points of contact by the plurality of fingers. With this configuration, the grip portion grips the package by means of friction generated between the finger and the package. As described above, various gripping mechanisms capable of gripping the package P of the package group B may be used.

The grip portion 30, that is, the upper surface sucking portion 142 and the side surface sucking portion 144 are rotated together with the base portion 122 of the support portion 26 and the second moving device 28 within a predetermined range by the rotation shaft 124 of the support portion 26.

The lifting and lowering portion 34 that lifts and lowers the intermediate conveyor portion 32 is provided on the frame 22 of the unloading apparatus 12. The intermediate conveyor portion 32 is supported by the lifting and lowering portion 34.

The lifting and lowering portion 34 includes, for example, a shaft 92 that extends in the Y-axis direction and is supported by the beam portion 52b at the upper end of the frame body 52, a Z-axis actuator 94 that is supported by one end of the shaft 92 and rotates the shaft 92, and a plurality of wires 96 wound around the shaft 92. The shaft 92 may extend not in the Y-axis direction but in the X-axis direction. When the Z-axis actuator 94 is driven, the shaft 92 rotates. When the shaft 92 rotates, the intermediate conveyor portion 32 supported by the wires 96 is lifted and lowered.

The intermediate conveyor portion 32 is, for example, a belt conveyor. The intermediate conveyor portion 32 may be a roller conveyor. The intermediate conveyor portion 32 includes, for example, a belt 102 on which the package can be placed and a motor 104 that drives the belt 102. The belt 102 is an endless belt. An upper surface 102a of the belt 102 is movable, for example, in the front-rear direction (X-axis direction) by a motor 42. The package P grasped by the grip portion 30 is placed on the upper surface 102a of the intermediate conveyor portion 32 due to the movement and grip releasing of the grip portion 30.

One end of the belt 102 is located near the front opening 56a. The other end of the belt 102 is located near the rear opening 56b. The distance from the one end of the belt 102 on the main conveyor 14 side to an upper surface 14a of the main conveyor 14 is smaller than the dimension of the package P in the X-axis direction, and is set to a distance by which the package P is moved from the upper surface 102a of the belt 102 to the main conveyor 14. In other words, the gap between the belt 102 and the upper surface 14a of the main conveyor 14 is set to a gap through which the package P does not fall.

The lifting and lowering portion 34 lifts and lowers the intermediate conveyor portion 32 so as to arrange the upper surface 102a of the belt 102 of the intermediate conveyor portion 32 at a position slightly higher than the upper surface 14a of the main conveyor 14. When the upper surface 102a of the belt 102 moves toward the main conveyor 14, the package P placed on the upper surface 102a is carried out to the main conveyor 14.

For the lifting and lowering portion 34, an example in which the shaft 92 and the actuator 94 are disposed on the upper side of the frame 22 has been described. The lifting and lowering portion 34 may be arranged on the lower side of the intermediate conveyor portion 32 to arrange the upper surface 102a of the belt 102 of the intermediate conveyor portion 32 at a desired position.

The lifting and lowering portion 34 is simply required to be configured to lift and lower the intermediate conveyor portion 32. The above-described configuration of the lifting and lowering portion 34 is an example and is not limited thereto.

The unloading apparatus 12 includes the controller 200. The controller 200 controls operation of each portion of the unloading apparatus 12. The main conveyor 14 may be controlled by the controller 200 or may be controlled by another controller. The controller 200 may be arranged adjacent to the frame 22 of the unloading apparatus 12 and the main conveyor 14, or may be located away from the frame 22 of the unloading apparatus 12 and the main conveyor 14.

The controller 200 includes a communication interface 202, a processor 204, a memory 206, and a storage 208. These can communicate with each other via a bus line 210.

The communication interface 202 is an interface used for communication with an external device. The communication interface 202 includes a terminal and a circuit corresponding to a communication standard or the like for the controller 200 to communicate with each portion of the unloading apparatus 12. The communication interface 202 is connected to and communicates with each of the first moving device 24, the grip portion 30, the intermediate conveyor portion 32, the first sensor 36, and the second sensor 38 in a wired or wireless manner under the control of the processor 204 via a network N. The controller 200 (processor 204) controls the X-axis actuator 86a, the Y-axis actuator 86b, the Z-axis actuator 74, and the rotation actuator 134 of the first moving device 24, the driving portion 126c of the second moving device 28, the grip portion 30, the motor 42 of the intermediate conveyor portion 32, the Z-axis actuator 94 of the lifting and lowering portion 34, the first sensor 36, and the second sensor 38.

The processor 204 includes, for example, a central processing unit (CPU). The memory 206 includes a read only memory (ROM) that is a read-only data memory or a random access memory (RAM) that temporarily stores data. The storage 208 may be a mass storage such as a hard disk drive (HDD) or a solid state drive (SSD). The memory 206 or the storage 208 stores control programs and various data of each device of the unloading apparatus 12. The processor 204 performs various processes based on a program or the like stored in the memory 206 or the storage 208. That is, the processor 204 executes various programs as a software function unit. An application specific integrated circuit (ASIC), a field programmable gate array (FPGA), or the like serving as a hardware functional unit may be used instead of the CPU.

Next, an example of the operation of the unloading apparatus 12 will be described with reference to FIGS. 4 to 7. Hereinafter, what the processor 204 executes includes what the controller 200 executes.

The processor 204 brings the unloading apparatus 12 into the initial state. The initial state is a state in which at least the first moving device 24, the support portion 26, the second moving device 28, and the grip portion 30 are located at the initial positions (fixed positions), and the intermediate conveyor portion 32 is stopped. The intermediate conveyor portion 32 is located at a predetermined height. At this time, the rotation actuator 134 pulls the piston 134b into the cylinder 134a.

The mount portion 8 is arranged at a predetermined position below the protrusion portion 54 and the first sensor 36 of the unloading apparatus 12. One or a plurality of packages P (package group B) are placed on the mount portion 8 in advance. The processor 204 performs control so that the first sensor 36 photographs the plurality of packages P1 placed on the mount portion 8, transmits detection information such as a photographed image to the processor 204 to recognize the position, size, and shape of the package P1 (step S101). That is, the processor 204 performs control so that the first sensor 36 acquires information on the package P1 including position information of the package P1. The processor 204 stores the detection information obtained by the first sensor 36 in the memory 206 and/or the storage 208.

When the presence of the package P is not recognized from the detection information from the first sensor 36, the processor 204 performs control to temporarily end the processing (No in step S102).

When the presence of the package P1 is recognized (Yes in step S102), the processor 204 performs control to formulate an action plan for carrying out the package P1 (step S103). In step S103, the processor 204 performs control to formulate the action plan based on the detection information (recognition result) of the first sensor 36 recognized in step S101, that is, the position, size, and shape of the package P1 in the uppermost stage Us.

The processor 204 determines the order of the packages P1 to be unloaded from the plurality of packages P1 in the uppermost stage Us recognized by the first sensor 36. For example, the processor 204 determines the unloading order of each package P1 in the uppermost stage Us so as to unload each package P1 in the uppermost stage Us onto the upper surface 102a of the belt 102 of the intermediate conveyor portion 32 at the shortest moving distance of the first moving device 24. The action plan of the processor 204 includes simultaneously gripping not only one but also a plurality of packages P1 based on the size (width in the left-right direction) of the package P1 acquired from the detection information of the first sensor 36.

The processor 204 performs control so that the first moving device 24 moves the grip portion 30 to the gripping position of the package P1 to be grasped in the uppermost stage Us according to the action plan (for example, the order of gripping) in step S103 (step S104). That is, the processor 204 operates the X-axis actuator 86a, the Y-axis actuator 86b, and the Z-axis actuator 74 so that the first moving device 24 moves the grip portion 30 to the gripping position of the package P1.

Here, the gripping position refers to a position where the first suction pads 142b of the upper surface sucking portion 142 are brought into contact with the upper surface Pa of the package P1 to be grasped placed on the mount portion 8.

At this time, the Z-axis actuator 94 of the intermediate conveyor portion 32 is controlled to adjust the height position of the upper surface 102a of the belt 102 of the intermediate conveyor portion 32 so that the upper surface 102a of the belt 102 of the intermediate conveyor portion 32 does not make contact with the first moving device 24, the support portion 26, and the grip portion 30.

The rotation actuator 134 is in a state in which the piston 134b is pulled in. At this time, the lower ends of the plurality of suction pads 142b of the upper surface sucking portion 142 are parallel to the XY plane. Therefore, the plurality of suction pads 142b of the upper surface sucking portion 142 come into contact with the upper surface Pa of the package P1 substantially simultaneously. Immediately before, at the same time as, or immediately after the plurality of suction pads 142b of the upper surface sucking portion 142 come into contact with the upper surface Pa of the package P1, the processor 204 performs control to drive the driving portion 126c of the second moving device 28 to move the moving portion 126b forward in the X-axis direction. At this time, the ends of the plurality of suction pads 144b of the side surface sucking portion 144 on the side surface Pb side of the package P1 are parallel to the YZ plane. Therefore, the plurality of suction pads 144b of the side surface sucking portion 144 come into contact with the side surface Pb of the package P1 substantially simultaneously. That is, the processor 204 performs control so that the grip portion 30 is brought into contact with the upper surface Pa and the side surface Pb on the near side of the package P1.

The processor 204 performs control to operate the negative pressure generating portion 40 to cause the first suction pads 142b and the second suction pads 144b to have a negative pressure until the vacuum pressure becomes constant. Thus, the processor 204 causes the suction pads 142b and 144b of the grip portion 30 to vacuum-suck and grip the upper surface Pa and the side surface Pb of the package P1 to be grasped. Therefore, as shown in FIG. 5, the processor 204 causes the grip portion 30 located on the end side of the first moving device 24 to grip the package P (step S105).

At this time, the lower ends of the plurality of suction pads 142b of the upper surface sucking portion 142 are parallel to the XY plane. The ends of the plurality of suction pads 144b of the side surface sucking portion 144 on the side surface Pb side of the package P are parallel to the YZ plane.

The processor 204 performs control to release the piston 134b from the cylinder 134a of the rotation actuator 134. The processor 204 operates the X-axis actuator 86a, the Y-axis actuator 86b, the Z-axis actuator 74, and the rotation actuator 134. At this time, the processor 204 controls the first moving device 24 to move the first moving device 24 upward of the package P along a direction intersecting the side surface Pb of the package P sucked by the side surface sucking portion 144 or a surface obtained by virtually extending the side surface Pb of the package P in a state in which the upper surface Pa and the side surface Pb of the package P are sucked by the upper surface sucking portion 142 and the side surface sucking portion 144. The processor 204 moves the rotation shaft 124 parallel to the Y-axis direction in a direction away from the frame 22 and upward along an appropriate locus using the first moving device 24.

At this time, the unloading apparatus 12 moves the package P1 while pressing the upper surface Pa of the package P2 on the lower side downward with a downward force with the bottom surface Pc of the package P1 grasped by the grip portion 30. Therefore, a downward pressing force acts on the package P2 on the lower side due to the movement of the package P1, so that the bottom surface Pc of the package P1 is easily peeled off from the anti-slip treatment agent S on the upper surface Pa of the package P2.

The processor 204 has released the piston 134b from the cylinder 134a of the rotation actuator 134. Therefore, when the rotation shaft 124 is moved along the appropriate locus, the support portion 26 rotates with respect to the fixed position due to the weights of the support portion 26, the grip portion 30 (the upper surface sucking portion 142 and the side surface sucking portion 144), and further the package P1. The processor 204 performs control to apparently push out the piston 134b from the cylinder 134a of the rotation actuator 134. The arm 122a of the base portion 122 of the support portion 26 and the moving portion 126b of the second moving device 28 rotate about the axis of the rotation shaft 124 with respect to the direction of the arm 122a of the base portion 122 along the X-axis direction, while maintaining the parallel state. Therefore, the arm 122a of the base portion 122 is inclined. That is, the support portion 26 and the grip portion 30 rotates about the predetermined rotation shaft 124.

The processor 204 performs control to apparently move the grip portion 30 from a near side to a far side (away side) with respect to the frame 22 of the unloading apparatus 12 using the X-axis actuator 86a of the first moving device 24, press the package P from the near side to the far side with the side surface sucking portion 144 while appropriately operating the X-axis actuator 86a, the Y-axis actuator 86b, the Z-axis actuator 74, and the rotation actuator 134 of the first moving device 24 to raise the upper surface sucking portion 142. Therefore, the processor 204 performs control to move the near side of the bottom surface Pc of the package P upward with respect to the far side while lifting the near side of the package P from the position shown in FIG. 5 to the position shown in FIG. 6 (step S106).

Here, the near side refers to the main conveyor 14 side along the X-axis direction with respect to the unloading apparatus 12. The far side refers to the side away from the main conveyor 14 along the X-axis direction with respect to the unloading apparatus 12.

As a result, the package P1 rotates to the far side with a side Pd of the lower end on the far side of the package P1 along the Y-axis direction (an end of the bottom surface Pc of the package P1 away from the side surface Pb sucked by the side surface sucking portion 144) serving as a supporting axis. At this time, the side Pd maintains its position. Therefore, the package P2 on the lower side of the package P1 grasped by the grip portion 30 is pressed downward and is restricted from moving upward by the side Pd of the package P1.

At this time, the angle between the bottom surface Pc of the package P1 grasped by the grip portion 30 and the upper surface Pa of the package P2 on the lower side is 10 degrees to 15 degrees, for example. In addition, the distance between the bottom side of the side surface Pb grasped by the side surface sucking portion 144 of the package P1 grasped by the grip portion 30 and the upper surface Pa of the package P2 on the lower side is about several centimeters, for example, about 5 cm. The angle and the distance are merely required to allow, for example, the bottom surface Pc of the package P1 grasped by the grip portion 30 to be separated from the anti-slip treatment agent S on the upper surface Pa of the package P2 on the lower side.

The package P grasped by the grip portion 30 presses the package P on the farther side than the package P grasped by the grip portion 30 with respect to the frame 22 of the unloading apparatus 12 toward the far side (away side), depending on a gap with the package P on the far side with respect to the frame 22 of the unloading apparatus 12. When the package P on the far side is pressed toward the far side by the package P grasped by the grip portion 30, as shown in FIG. 6, the package P on the far side in the uppermost stage Us elastically deforms while maintaining a state in which the bottom surface Pc is in contact with the upper surface Pa of the package P in the middle stage Ms on the lower side.

As described above, the processor 204 performs control to lift the upper surface Pa on the near side of the package P1 upward with respect to the upper surface Pa on the far side, without substantially moving the side Pd on the far side of the package P1, while pressing the side surface Pb of the package P1 grasped by the grip portion 30 to the far side in the unloading apparatus 12. That is, the processor 204 causes the package P1 grasped by the grip portion 30 in the unloading apparatus 12 to rotate with the side Pd of the package P1 serving as a supporting axis. In this manner, the processor 204 performs control so that the unloading apparatus 12 peels off the bottom surface Pc of the package P1 grasped by the grip portion 30 from the anti-slip treatment agent S on the upper surface Pa of the package P2 on the lower side of the package P1 grasped by the grip portion 30. As described above, the unloading apparatus 12 raises the lower end of the side surface Pb sucked by the side surface sucking portion 144 on the bottom surface Pc of the package P1, with respect to the end Pd away from the side surface Pb sucked by the side surface sucking portion 144 on the bottom surface Pc of the package P1. At this time, the bottom surface Pc serving as a point of action is raised due to the principle of leverage with the end Pd serving as a fulcrum and the sucking portions 142,144 serving as a point of force. Since the end Pd itself of the package P1 is not separated from the upper surface Pa of the package P2 on the lower side and is not actually lifted, the bottom surface Pc of the package P1 can be peeled off with a light force from the anti-slip treatment agent S on the upper surface Pa of the package P2 below the package P1 grasped by the grip portion 30.

As in the related art, when the package P1 grasped by the grip portion 30 is simply moved upward along the Z-axis direction with respect to the package P2 on the lower side, a tensile load is applied to the bottom surface Pc of the package P1 so as to peel off the bottom surface Pc of the package P1 substantially simultaneously with respect to all the contact surfaces with the anti-slip treatment agent S between the package P1 grasped by the grip portion 30 and the package P2 on the lower side. In this case, a load may be applied to the bottom surface Pc of the package P1 grasped by the grip portion 30 and the upper surface Pa of the package P2 below the package P1 grasped by the grip portion 30. In addition, when the bottom surface Pc of the package P1 is peeled off from the anti-slip treatment agent S, the bottom surface Pc may not be peeled off over an appropriate time and be rapidly peeled off. In this case, appropriate vibration may be applied to the grip portion 30. The vibration input can be a load on the grip portion 30. The vibration input can be a load on the entire unloading apparatus 12 including the grip portion 30.

As in the present embodiment, when the unloading apparatus 12 rotates the grasped package P1 with the side Pd serving as a supporting axis without substantially moving the side Pd with respect to the package P2 on the lower side, the bottom surface Pc of the package P1 is gradually peeled off from the contact surface with the anti-slip treatment agent S between the bottom surface Pc of the package P1 and the upper surface Pa of the package P2 on the lower side due to the principle of leverage while restricting the upward movement of the package P2 using the side Pd of the package P1. Therefore, the load on the bottom surface Pc of the package P1 due to the adhesion of the anti-slip treatment agent S becomes small as the rotation amount about the side Pd of the package P1 serving as the supporting axis becomes large. That is, the contact surface with the anti-slip treatment agent S between the bottom surface Pc of the package P1 and the upper surface Pa of the package P2 on the lower side does not suddenly become small but gradually becomes small. Therefore, when the bottom surface Pc of the package P1 is peeled off from the anti-slip treatment agent S, it is unlikely that appropriate vibration is applied to the grip portion 30. In other words, when the package P1 is grasped and lifted by the grip portion 30, the load is hardly generated on not only the grip portion 30 but also the entire unloading apparatus 12 because the package P2 below the package P1 grasped by the grip portion 30 is prevented from being hung in a row due to the anti-slip treatment agent S. Then, by operating the unloading apparatus 12 based on the control by the controller 200 as in the present embodiment, the unloading apparatus 12 reduces the load on the bottom surface Pc of the package P1 and alleviates the load on the upper surface Pa (exterior) of the package P2 on the lower side.

The processor 204 performs control so that the first moving device 24 operates the grip portion 30 from the position shown in FIG. 6 to the position shown in FIG. 7.

The processor 204 measures the height of the bottom surface Pc of the package P1 grasped by the grip portion 30 and moved to the position shown in FIG. 7 using the second sensor 38. The processor 204 performs control to operate the Z-axis actuator 94 based on the height of the bottom surface Pc of the package P1 measured by the second sensor 38 and move the intermediate conveyor portion 32 to an appropriate height. That is, the lifting and lowering portion 34 that lifts and lowers the intermediate conveyor portion 32 is caused to move the upper surface 102a of the belt 102 of the intermediate conveyor portion 32 to the same position as or slightly lower than the position of the bottom surface Pc of the package P1 (step S107).

The height of the package P1 grasped by the grip portion 30 can be calculated based on the information on the distance to the upper surface. Pa of the package P1 already acquired by the first sensor 36 and the distance to the bottom surface Pc of the package P1 by the second sensor 38.

After adjusting the height of the upper surface 102a of the belt 102 of the intermediate conveyor portion 32, the processor 204 moves the grip portion 30 to a position where the package P1 is to be placed (the upper surface 102a of the belt 102 of the intermediate conveyor portion 32) using the first moving device 24.

When the grip portion 30 is moved by the first moving device 24 to the position where the package P1 is to be placed (the upper surface 102a of the belt 102 of the intermediate conveyor portion 32) after the first moving device 24 is moved upward of the package P1 and the package P1 is rotated with the side Pd serving as a supporting axis, the processor 204 performs control so that the first moving device 24 moves the side surface sucking portion 144 in a direction away from the package P in a state in which the side surface Pb of the package P is sucked by the side surface sucking portion 144. In other words, the processor 204 controls the first moving device 24 so that the side surface sucking portion 144 is moved in the direction toward the near side along the direction intersecting the side surface Pb of the package P1 or the surface obtained by virtually extending the side surface Pb. Therefore, the processor 204 performs control to operate the first moving device 24 to move the package P already grasped by the grip portion 30 in a direction away from the side surface Pb where the package P is assumed to be the one immediately before being grasped by the grip portion 30. That is, the direction in which the first moving device 24 is separated or the direction toward the near side in which the first moving device 24 is moved refers to a direction in which the side surface sucking portion 144 is separated from the side surface Pb of the package P by operating the second moving device 28 when the support portion (rotation portion) 26 is at the fixed position. The direction in which the first moving device 24 is moved to be separated coincides or substantially coincides with the horizontal direction.

Therefore, the processor 204 controls the first moving device 24 to move the package P grasped by the grip portion 30 horizontally or substantially horizontally and performs control to move the package P to the upper surface 102a of the belt 102 of the intermediate conveyor portion 32 along the X axis through the front opening 56a of the frame 22 (step S108). At this time, the processor 204 appropriately operates the X-axis actuator 86a, the Y-axis actuator 86b, and the Z-axis actuator 74 of the first moving device 24. In this case, the unloading apparatus 12 pulls the package P1 to above the upper surface 102a of the belt 102 of the intermediate conveyor portion 32 through the front opening 56a of the frame 22 while gripping the package P1 with the grip portion 30 and bringing the side Pd of the rotated package P1 into contact with the upper surface Pa of the package P2 on the lower side.

With such control, when the package P1 grasped by the grip portion 30 is pulled to above the upper surface 102a of the belt 102 of the intermediate conveyor portion 32, the side Pd of the package P1 comes into contact with the upper surface 102a of the belt 102 of the intermediate conveyor portion 32.

The processor 204 controls the negative pressure generating portion 40 to release the generation of the negative pressure, and performs control to release the suction to the package P grasped by the grip portion 30 and release the package P onto the upper surface 102a of the belt 102 of the intermediate conveyor portion 32 (step S109). The processor 204 causes the grip portion 30 to release the grasped package P and operates the Z-axis actuator 74 of the first moving device 24 to move the upper surface sucking portion 142 of the grip portion 30 upward. The processor 204 drives the driving portion 126c of the second moving device 28 to move the moving portion 126b to the near side along the X-axis direction to retract the side surface sucking portion 144 to the near side along the X-axis direction with respect to the package P, that is, to the main conveyor 14 side. At this time, the processor 204 operates the rotation actuator 134 to pull the piston 134b into the cylinder 134a to make the arm 122a of the base portion 122 of the support portion 26 parallel to the X-axis direction and the extension portion 122b of the base portion 122 parallel to the Y-axis direction.

The processor 204 operates the Z-axis actuator 94 of the lifting and lowering portion 34 to adjust the height of the upper surface 102a of the belt 102 of the intermediate conveyor portion 32 to the height of the main conveyor 14 (step S110). At this time, in order to prevent the first moving device 24 and the package P from coming into contact with each other, the processor 204 operates the Z-axis actuator 74 of the first moving device 24 as necessary to further move the first moving device 24 upward. The processor 204 drives the motor 42 of the intermediate conveyor portion 32 to operate the belt 102 of the intermediate conveyor portion 32. Therefore, the package P is carried out to the outside of the frame 22 through the rear opening 56b of the frame 22 and placed on the main conveyor 14.

The processor 204 determines whether or not there is another package P1 in the same stage Us of the package group B (step S111). At this time, the processor 204 may determine the presence or absence of the package P1 based on the information already detected by the first sensor 36, or may obtain the information on the presence or absence of the package P1 again using the first sensor 36. If there is another package P1 in the same stage Us (Yes in step S111), the process returns to step S104. If there is no other package P1 in the same stage Us (No in step S111), the process returns to step S101.

As described above, the unloading apparatus 12 unloads all the packages P1 with an appropriate height one by one or a plurality of packages P1, such as two packages arranged in the left-right direction (Y-axis direction), simultaneously, from the uppermost stage Us of the package group B on the mount portion 8 onto the upper surface 102a of the belt 102 of the intermediate conveyor portion 32, and carries out the unloaded package P1 to the main conveyor 14. Thereafter, the unloading apparatus 12 unloads all the packages P2 one by one or a plurality of packages P2, such as two packages arranged in the left-right direction (Y-axis direction), simultaneously, from the middle stage Ms of the package group B on the mount portion 8 onto the upper surface 102a of the belt 102 of the intermediate conveyor portion 32, and carries out the unloaded package P2 to the main conveyor 14. Thereafter, further, the unloading apparatus 12 unloads all the packages P3 one by one or a plurality of packages P3, such as two packages arranged in the left-right direction (Y-axis direction), simultaneously, from the lowermost stage Ls of the package group B on the mount portion 8 onto the upper surface 102a of the belt 102 of the intermediate conveyor portion 32, and carries out the unloaded package P3 to the main conveyor 14.

In a case where the package P3 in the lowermost stage Ls is rotated about the side Pd of the package P3 by the unloading apparatus 12, the unloading apparatus 12 has no package P further below. In this case, the unloading apparatus 12 controls the first moving device 24 to press the mount portion 8 downward with the bottom surface Pc of the package P3. In addition, the unloading apparatus 12 controls the first moving device 24 to maintain a state in which the side Pd of the package P3 is in contact with the mount portion 8.

In a case where two packages P arranged in the left-right direction are simultaneously grasped by the grip portion 30, a load that is, for example, approximately twice as large as that in a case where one package P is grasped is applied to the grip portion 30. However, since the respective packages P are grasped by the suction pads 142b and 144b, it is not necessary to greatly increase the negative pressures in the first suction pad 142b and the second suction pad 144b in accordance with the package P.

The arrangement and dimensions of each package P of the package group B may be stored in advance in the storage 208 of the controller 200.

In the present embodiment, an example using the first sensor 36 and the second sensor 38 has been described. The first sensor 36 and the second sensor 38 may be unnecessary. For example, in a case where the mount portion 8 is arranged at a predetermined position and the position of the mount portion 8 and the position, size, and shape of each package P of the package group B with respect to the mount portion 8 are stored in, for example, the storage 208 or the like, each package P can be carried out to the main conveyor 14 using the unloading apparatus 12 according to a control program for carrying out the package P created in advance and stored in the memory 206 and/or the storage 208 or the like without formulating an action plan. It is also preferable that the control program is not stored in the memory 206 and/or the storage 208 but is placed on an appropriate server or a cloud. In this case, the control program is executed while communicating with the processor 204 via the communication interface 202.

In the present embodiment, an example of using the first moving device 24, the support portion (rotation portion) 26, and the second moving device 28 forming the orthogonal arm to appropriately rotate the grip portion 30 has been described. Also by using a six-axis robot instead of the first moving device 24, the support portion 26, and the second moving device 28, it is possible to unload the package P onto the intermediate conveyor portion 32 or the like while minimizing the influence of the anti-slip treatment agent S by rotating the package P with the side indicated by the reference sign Pd of each package P serving as a supporting axis, and separating the bottom surface Pc of the package P1 on the upper side from the upper surface Pa of the package P2 on the lower side.

In the present embodiment, it has been described that the rotation shaft 124 of the support portion 26 is parallel to the Y-axis direction. The rotation shaft 124 of the support portion 26 may be rotatable within an appropriate range on the XY plane, for example, with the movable portion 86 of the horizontal moving device 64 serving as a fulcrum. In this case, even if the side surface Pb of the package P placed on the mount portion 8 is not parallel to the YZ plane, the package P can be appropriately grasped by the side surface sucking portion 144 of the grip portion 30.

In the present embodiment, an example in which the anti-slip treatment agent S is present between the upper and lower packages P1 and P2 and between the packages P2 and P3 has been described. Even when the anti-slip treatment agent S is not present between the upper and lower packages P1 and P2 and between the packages P2 and P3, it is possible to unload the package P in the same manner using the unloading apparatus 12.

When the package P is simply lifted upward along the Z-axis direction by a general unloading apparatus, the package immediately below the grasped package P that is present via the anti-slip treatment agent S may be hung or about to be hung together with the grasped package P without being grasped by the grip portion. At this time, a load such as that twice as large as the planned package P is unintentionally applied to the grip portion of the unloading apparatus. Therefore, in the unloading apparatus, a gripping error may occur, such as the hung package P falling off due to gravity or the package falling off from the grip portion. To prevent the package from falling off from the grip portion, the unloading apparatus can increase the gripping force of the grip portion. However, the increase in the gripping force may apply a large load to the exterior of the package P such as cardboard.

On the other hand, the unloading apparatus 12 according to the present embodiment can reduce the influence of the anti-slip treatment agent S before lifting and separating the grasped package P1 upward from the package P2 on the lower side by rotating the bottom surface Pc of the package P1 on the upper side with one side Pd of the bottom surface Pc serving as a supporting axis while maintaining the position of the upper surface Pa of the package P2 on the lower side. The unloading apparatus 12 according to the present embodiment can unload each package P from the package group B onto the intermediate conveyor portion 32 while gripping the package P1 on the upper side with the grip portion 30 with less influence of the anti-slip treatment agent S in the gap with the package P2 on the lower side. Therefore, a load such as that twice as large as the planned package P is prevented from being unintentionally applied to the grip portion 30 of the unloading apparatus 12. As a result, the unloading apparatus 12 according to the present embodiment can suppress the possibility that the gripping error occurs in the grip portion 30 compared with the unloading apparatus having a grip portion that simply lifts the package P upward.

In addition, the unloading apparatus 12 according to the present embodiment can simultaneously grip a plurality of packages P such as two packages arranged in the left-right direction. At this time, each package P is in contact with both the upper surface sucking portion 142 and the side surface sucking portion 144. Therefore, even in a case where the plurality of packages P arranged in the left-right direction are simultaneously grasped by the grip portion 30, it is not necessary, for example, to increase the magnitude of the negative pressure (gripping force) of the suction pads 142*b* and 144*b* of the grip portion 30 compared with a case where only one package P is grasped. As a result, a large load can be prevented from being applied to the exterior of the package P such as cardboard.

For the moving device 24 of the unloading apparatus 12 according to the present embodiment, an example that uses the connecting portion 66 having the rotation actuator 134 has been described. The connecting portion 66 is not necessarily required as long as the support portion 26 can be arranged at the initial position (fixed position) due to energizing when the package P is not grasped by the grip portion 30, for example, by disposing a coil spring on the rotation shaft 124. When the package P having an appropriate weight is grasped by the grip portion 30, the support portion 26 may rotate due to gravity within a predetermined range at an appropriate speed while the coil spring plays a role of a damper from the position shown in FIG. 5 to the position shown in FIG. 6.

In the unloading apparatus 12 according to the present embodiment, an example has been described in which the package P1 grasped by the grip portion 30 is rotated so as to reduce the influence of the anti-slip treatment agent S on the upper surface Pa of the package P2 on the lower side by separating the near side of the bottom surface Pc of the package P1 with respect to the far side. The unloading apparatus 12 may rotate the package P1 grasped by the grip portion 30 so as to reduce the influence of the anti-slip treatment agent S on the upper surface Pa of the package P2 on the lower side by separating the far side of the bottom surface Pc of the package P1 with respect to the near side.

The unloading apparatus 12 according to the present embodiment includes the upper surface sucking portion (first sucking portion) 142 that sucks the upper surface Pa of the package P, the side surface sucking portion (second sucking portion) 144 that sucks the side surface Pb of the package P, the first moving device 24 that moves the upper surface sucking portion 142 and the side surface sucking portion 144, the support portion (rotation portion) 26 that rotatably connects the upper surface sucking portion 142 and the side surface sucking portion 144 to the first moving device 24, and the processor 204 that controls the first moving device 24. The processor 204 controls the first moving device 24 to move the upper surface Pa and the side surface Pb of the package P upward along the direction intersecting the side surface Pb of the package P sucked by the side surface sucking portion 144 or a surface obtained by virtually extending the side surface Pb of the package P in a state in which the upper surface Pa and the side surface Pb of the package P are sucked by the upper surface sucking portion 142 and the side surface sucking portion 144. Thereafter, the processor 204 controls the first moving device 24 so that the first moving device 24 moves to a position where the package P is to be placed.

In addition, the processor 204 controls the support portion (rotation portion) 26 so that the support portion (rotation portion) 26 is in a rotatable release state with respect to the first moving device 24 during a period from when the package P is sucked by the upper surface sucking portion 142 to when the package P is placed on the position where the package P is to be placed.

In addition, the unloading apparatus 12 according to the present embodiment includes the second moving device 28 that moves the side surface sucking portion 144 in a direction approaching the side surface Pb of the package P and in a direction separating from the side surface Pb of the package P. The processor 204 controls the operation of the second moving device 28. The second moving device 28 is supported by the support portion (rotation portion) 26.

In addition, the processor 204 performs control so that, when sucking the package P and moving the first moving device 24 upward along the direction intersecting the side surface Pb of the package P or a surface obtained by virtually extending the side surface Pb, the end Pd of the bottom surface Pc of the package P away from the side surface Pb sucked by the side surface sucking portion 144 is maintained in contact with the upper surface Pa of the package P on the lower side facing the bottom surface Pc of the package P or the mount portion 8 on which the package P is placed in advance.

In addition, the processor 204 controls the first moving device 24 to move in a separating direction when moving the first moving device 24 to the position where the package P is to be placed.

In addition, the unloading method according to the present embodiment includes: causing the upper surface Pa of the package P to be sucked by the upper surface sucking portion 142 of the unloading apparatus 12 and causing the side surface Pb of the package P to be sucked by the side surface sucking portion 144 of the unloading apparatus 12; moving the upper surface Pa and the side surface Pb of the package P upward along a direction intersecting the side surface Pb of the package P or a surface obtained by virtually extending the side surface Pb in a state in which the upper surface Pa of the package is sucked by the upper surface sucking portion 142 and the side surface Pb of the package P is sucked by the side surface sucking portion 144; and moving the package P to the position where the package P is to be placed in a state in which the upper surface Pa of the package P is sucked by the upper surface sucking portion 142 and the side surface Pb of the package P is sucked by the side surface sucking portion 144.

In addition, the unloading method according to the present embodiment makes the upper surface sucking portion 142 and the side surface sucking portion 144 rotatable with respect to the first moving device 24 that moves the upper surface sucking portion 142 and the side surface sucking portion 144 during a period from when the package P is sucked by the upper surface sucking portion 142 and the side surface sucking portion 144 to when the package P is moved to the position where the package P is to be placed.

According to at least one embodiment described above, it is possible to provide the unloading apparatus 12 and the unloading method capable of unloading the package more efficiently.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An unloading apparatus comprising:
   a first sucking portion that is configured to suck an upper surface of a package;
   a second sucking portion that is configured to suck a side surface of the package;
   a first moving device that is configured to move the first sucking portion and the second sucking portion;
   a rotation portion that rotatably connects the first sucking portion and the second sucking portion to the first moving device; and
   a processor that is configured to control the first moving device,
   wherein from a state in which the upper surface of the package is sucked by the first sucking portion and the side surface of the package is sucked by the second sucking portion, and the package is supported from below,
   the processor is configured to control the first moving device to move the first moving device upward along a direction intersecting the side surface of the package sucked by the second sucking portion or a surface obtained by virtually extending the side surface, and
   the processor thereafter is configured to control the first moving device to move the first moving device to a position where the package is to be placed.

2. The unloading apparatus according to claim 1, wherein the processor is configured to control the rotation portion so that the rotation portion is in a rotatable release state with respect to the first moving device during a period from when the package is sucked by the first sucking portion to when the package is placed on the position where the package is to be placed.

3. The unloading apparatus according to claim 1, comprising a second moving device that is configured to move the second sucking portion in a direction approaching the side surface of the package and in a direction separating from the side surface of the package,
   wherein:
   the processor is configured to control the second moving device, and
   the second moving device is supported by the rotation portion.

4. The unloading apparatus according to claim 1, wherein the processor is configured to control the first moving device so that, when sucking the package and moving the first moving device upward along the direction intersecting the side surface of the package or the surface obtained by virtually extending the side surface, an end of a bottom surface of the package away from the side surface sucked by the second sucking portion is maintained in contact with the upper surface of a package under the package or a mount portion on which the package is placed.

5. The unloading apparatus according to claim 1, wherein the processor is configured to control the first moving device to move the first moving device in a direction toward a side of the position where the package is to be placed along the direction in which the second sucking portion intersects the side surface of the package or the surface obtained by virtually extending the side surface when moving the first moving device to the position where the package is to be placed.

6. An unloading method comprising:
   sucking an upper surface of a package with a first sucking portion of an unloading apparatus and sucking a side surface of the package with a second sucking portion of the unloading apparatus;
   moving the upper surface and the side surface of the package upward along a direction intersecting the side surface of the package or a surface obtained by virtually extending the side surface from a state in which the upper surface of the package is sucked by the first sucking portion and the side surface of the package is sucked by the second sucking portion, and the package is supported from below; and
   moving the package to a position where the package is to be placed in a state in which the upper surface of the package is sucked by the first sucking portion and the side surface of the package is sucked by the second sucking portion.

7. The unloading method according to claim 6, wherein the first sucking portion and the second sucking portion are rotatable with respect to a first moving device that is configured to move the first sucking portion and the second sucking portion during a period from when the package is sucked by the first sucking portion and the second sucking portion to when the package is moved to the position where the package is to be placed.

* * * * *